F. P. BUSHNELL.
ADJUSTABLE TAB PROTECTOR.
APPLICATION FILED AUG. 28, 1917.
1,317,265. Patented Sept. 30, 1919.
2 SHEETS—SHEET 1.
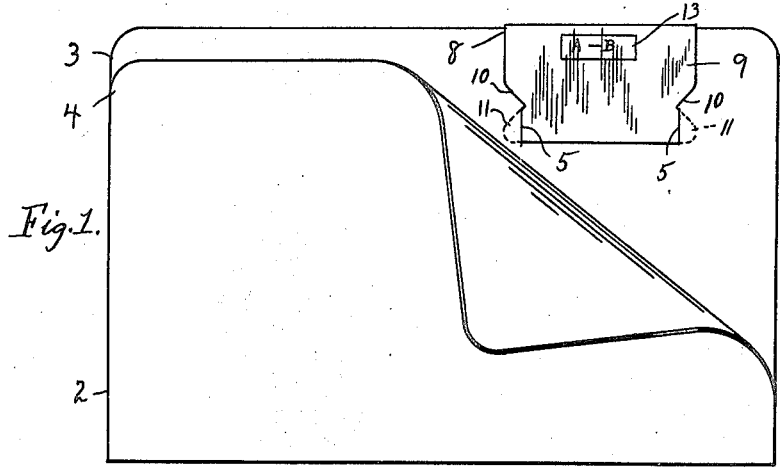
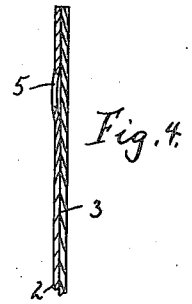
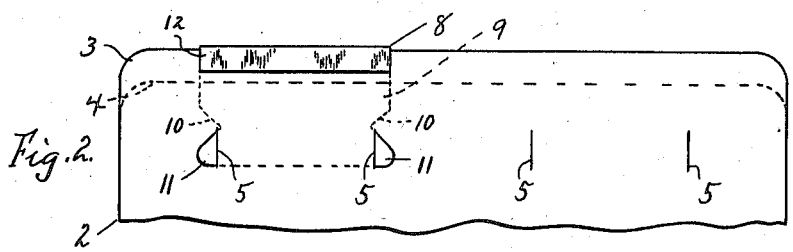
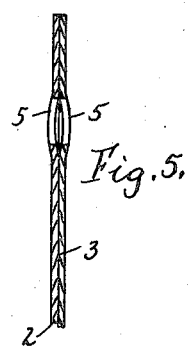
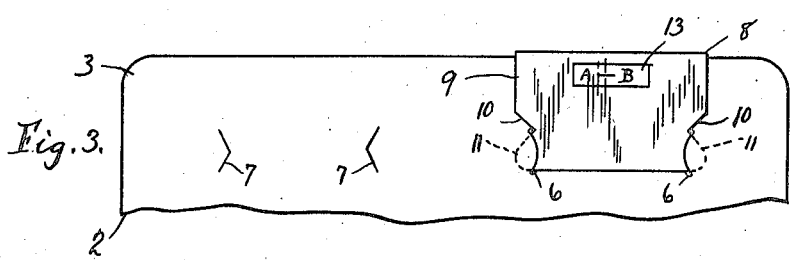
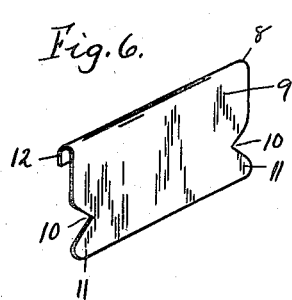
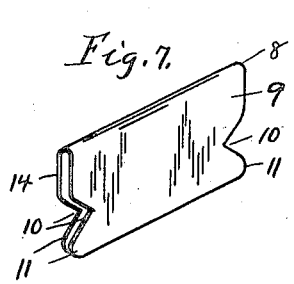
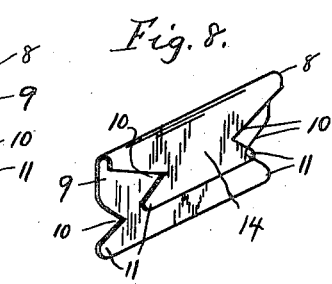
Witnesses:
Inventor
Frederick P. Bushnell
By his Attorney

F. P. BUSHNELL.
ADJUSTABLE TAB PROTECTOR.
APPLICATION FILED AUG. 28, 1917.

1,317,265.

Patented Sept. 30, 1919.
2 SHEETS—SHEET 2.

Witnesses

Inventor
Frederick P. Bushnell
By W. W. Williamson
Attorneys

UNITED STATES PATENT OFFICE.

FREDERICK P. BUSHNELL, OF PHILADELPHIA, PENNSYLVANIA.

ADJUSTABLE TAB-PROTECTOR.

1,317,265. Specification of Letters Patent. Patented Sept. 30, 1919.

Application filed August 28, 1917. Serial No. 188,566.

*To all whom it may concern:*

Be it known that I, FREDERICK P. BUSHNELL, a citizen of the United States, residing at Philadelphia, in the county of Philadelphia and State of Pennsylvania, have invented new and useful Improvements in Adjustable Tab-Protectors, of which the following is a specification.

My invention relates to new and useful improvements in adjustable tab protectors, and has for its object to provide an exceedingly simple and effective device of this character which may be readily and quickly attached to or detached from the tab of a card index system index card, one of the walls of a filing evelop or folder or other similar object, whereby an index or indicator may be placed upon the object to which the protector is to be attached, and said protector placed in position to prevent the fingers of the user from coming in contact therewith, thereby keeping the index or indicator clean, and preventing the same from being rubbed off or displaced if contained upon a label, the construction of the protector also permitting the same to be readily removed, so that the index or indicator may be removed or replaced.

A further object of the invention is to produce an adjustable tab protector from some suitable material such as celluloid or a substitute therefor, which will be transparent, so that the indications may be viewed through the protector, and which will have sufficient stiffness to retain its form, and also being sufficiently flexible to permit its ready application to an object.

A further object of the invention is to provide a device, which may be readily and quickly attached to or removed from an object, so that the same may be adjusted to different positions upon said object, or to permit access to a label, index or indication beneath the same, or on the back thereof, said device also being such that the index or indication could be placed directly thereon as by writing, printing, embossing, indenting or perforating the characters, indices, indication marks, letters, numerals, words or signs on either face thereof.

A still further object of the invention is to provide a device known as a tab protector of some suitable opaque, translucent or clouded material, whereby markings thereon will be readily distinguishable, said material being of various colors for classification and sufficiently flexible to permit the device made therefrom to be readily applied to an object, and having sufficient resiliency to approximately maintain its normal shape when in position on the object.

Another object of the invention is to provide an adjustable tab protector formed from celluloid or other suitable similar material, having a body provided with tongues for insertion in slots or pockets in an object, and having a flange formed from one edge adapted to overlie one edge, and one face of the object to which it is attached, said flange and tongues maintaining the device in position.

Another object of the invention is to provide a device for attachment to an object for use as a protector for indices or indication marks, for carrying labels, having markings thereon, or for containing the characters or markings comprising two approximately parallel leaves each provided with means for insertion in an object whereby the device may be detachably held in place upon an object with the leaves overlying opposite faces of said object.

Still another object of the invention is to provide in combination with an object such as a filing envelop or folder or a guide card of a card index system an adjustable and detachable tab protector consisting of a body having means in the form of tongues for insertion in slots, a number of which are provided, whereby one portion of the protector will be held securely in position and a flange adapted to project over the edge of the object to which the protector is attached, so as to hold another portion of the body in position, said flange projecting downward over the back of the object with its lower edge terminating short of the upper edge of the flap or front leaf of the folder, thereby preventing said flange of the protector from catching over the front flap of the next adjacent filing envelop or folder when a number of said filing envelops or folders are placed together.

Another object of the invention is to provide a tab protector having attaching tongues in combination with a filing envelop, folder, index card or the like having slots, said slots passing entirely through the tab wall of the filing envelop, folder or the like, when said tab wall is of single thickness, said slots being formed in one or both sheets or thicknesses of the tab wall, when the same is of two thicknesses.

A still further object of the invention is to form an easily adjustable projecting device for sheets such as the tab sheet of a filing system to be used with or without designating marks at the point or points where said sheets are subject to wear if unprotected.

With these ends in view, my invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which—

Figure 1, is a front elevation of a folder used in filing systems showing my invention applied thereto, the front leaf of said folder being turned down to more clearly illustrate the application of the adjustable tab protector.

Fig. 2, is a fragmentary back elevation thereof.

Fig. 3, is a fragmentary front elevation of the tab sheet or back wall of the folder, showing two different forms of slots and illustrating the tab protector as attached to the tab wall.

Fig. 4, is a vertical sectional view of a double walled or two ply tab sheet having a slot in one of the plies.

Fig. 5, is a similar view, showing slots in both plies.

Fig. 6, is a perspective view of the adjustable and detachable tab protector.

Fig. 7, is a similar view of a slightly modified form thereof.

Fig. 8, is a similar view of another form of the protector.

Figure 9:
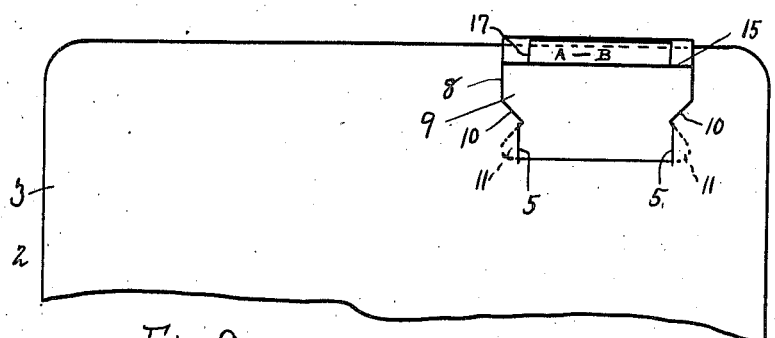
Fig. 9, is a fragmentary front elevation of the tab sheet or back wall of the folder showing another form of my invention.

In carrying out my invention as here embodied 2 represents a folder as used in filing systems, and is here utilized to represent an object to which the protector is to be attached, said object in practice being a folder of any style, a filing envelop, a guide card or any sheet adapted to be used as an index card on which is placed, letters, numerals, words, designating marks or characters.

As here illustrated the folder comprises a back wall or tab sheet 3 and a front wall or flap 4, the upper edge of the latter terminating short of the upper edge of the former, as plainly shown in Fig. 1. The back wall or tab sheet has formed therein, some distance below the upper edge and inwardly from the side edges any desirable distance, one or more slots 5 which are preferably straight, as shown in Figs. 1 and 2, but which if found desirable may be of any other shape, such as arcuate or V shaped as shown in Fig. 3, and designated by the reference numerals 6 and 7 respectively.

Where the tab sheet or back wall is of a single thickness or ply, these slots or slits pass entirely therethrough, but when said back wall or tab sheet is of a double thickness or two ply, then the slots may be made in only one of the thicknesses or plies as shown in Fig. 4, or the slots may be produced in both of the thicknesses or plies as shown in Fig. 5, and these slots may aline or not, depending upon the construction of the tab protector used.

The reference numeral 8 designates my improved adjustable and detachable tab protector which is produced from celluloid, a substitute for celluloid, some suitable composition or other similar material, the same being sufficiently stiff or resilient to maintain its normal shape and position when in place upon an object, such as the folder shown in the drawings, and also preferably, although not necessarily having sufficient flexibility to follow the lines or shapes of the object to which it is attached during the use of said object.

As shown in Fig. 1 the protector is formed from some suitable transparent material such as celluloid, and comprises a body 9 adapted to overlie the front face of the rear wall or tab sheet 3 of the folder, said body having oppositely disposed notches 10 produced in opposite edges opposite each other, as plainly shown in Figs. 1 and 6, said notches leaving reduced portions or tongues at the lower corners which are adapted to be inserted in the straight slots 5 or the slots of the construction designated by the numerals 6 and 7 in Fig. 3.

Integral with the upper edge of the body 9 is formed a depending flange 12 which is formed from the body by bending the same back upon itself, so that said flange lies parallel with the body, but is spaced therefrom, whereby said flange will overlie the back face of the rear wall or tab sheet 3 as plainly shown in Fig. 2.

In placing the adjustable and detachable tab protector upon an object such as the rear wall or tab sheet 3 of a folder, the same is placed thereon so that the body overlies the front face of the tab sheet 3, with the flange 12 projecting over the upper edge of the tab sheet and depending therefrom, so as to overlie the back face of the tab sheet, thereby holding the upper edge of the body in position with relation to the tab sheet and preventing accidental displacement thereof. After placing the protector in this position one of the tongues 11 is inserted in one of the slots 5, and the body of the protector then flexed so that the opposite tongue may be inserted in another slot, thus attaching the lower edge or the corners of the body to the object, so as to prevent its accidental displacement, and securely hold the same in position while in use.

In practice these protectors are transparent and cover a label 13 secured to the back wall or tab sheet 3 of the folder, said label containing the indication marks, indices or designating characters. The label instead of being pasted directly upon the tab sheet 3 may be pasted to the underface of the tab protector, or instead of using a label at all, the markings or indication characters may be written or printed directly upon the sheet 3 or the protector.

Where the designation marks, characters or indices are written, printed, embossed, indented, perforated or placed upon the protector, said protector should be formed of opaque, translucent or clouded material, so that the characters or markings will be more plainly visible.

When the designation marks, indices or characters are placed upon the tab sheet 3, the protector covers the same, so as to prevent it from becoming erased, detached or soiled, and yet said protector may be readily and quickly removed, so as to permit the erasure of the designation marks or characters or the removal of a label, and the remarking of the tab sheet or the replacing of an old label, after which the designation marks, characters or label may be again covered by the protector.

Heretofore it has been necessary to mark the filing folders, envelops or guide cards in the place of manufacture, and then cover the designation marks or characters with a sheet of celluloid, which was permanently fastened over the markings to the object having said markings thereon, and making it impossible for the user to change the designation marks or characters in a satisfactory and neat manner, but by the use of my improvement the designation marks or characters may be changed as often as necessary or placed in different positions relative to the object on which they are made, and the same covered by one of my improved protectors so that the outfit will have an exceedingly neat appearance.

In using straight slots as designated by the numeral 5, it is only necessary to separate the edges for the insertion of the tongues 11 of the protector, but I have found that where the tab sheet 3 is formed of two thicknesses or plies as shown in Fig. 4, and a slot is made in only one of the thicknesses or plies, it is rather difficult to separate the edges so that the tongues 11 of the protector may be inserted. Thus at some times when the tongues 11 are being inserted the stock is split but if these slots are cut in some other shape such as arcuate or V shaped, the tongues thus formed may be raised and the tongues 11 of the protector readily inserted.

In Fig. 7 I have shown a slightly modified form of my invention in which the portion designated as a flange 12 is extended to approximately the same length as the body 9, thus forming another similar wall or leaf 14, and this leaf 14 is provided with tongues 11 in the same manner as the body 9, so that in reality the protector is formed from a single sheet of material bent upon itself to form two leaves, each of the side edges of which has a notch therein, so as to form tongues 11, one at each of the free corners of both leaves, and when the tongues of each of the leaves coincide as in Fig. 7, the protector is used with a two ply sheet having alining slots formed in each of the plies, or thicknesses, as shown in Fig. 5, so that the tongues 11 of the body 9 are inserted in the set of slots in one of the plies and the tongues 11 of the leaf 14 are inserted in a set of slots in the other thickness or ply of the tab sheet 3.

In Fig. 8 I have shown another style of my invention, which illustrates the manner in which the leaf 14' may be of less length and width than the body or vice versa, and the attaching means represented by the tongues 11 may be two in number as shown.

Figure 10:
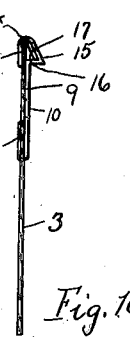
Fig. 10, is an edge view of the protector, showing the tab sheet in section.

In Figs. 9 and 10 I have shown the body of my improved adjustable tab protector provided with an angular projection 15 bent up from the material of the body, so that when the tab protector is upon the tab sheet, a cavity or chamber 16 is formed, in which may be placed a sheet of paper or label containing designation marks.

Figure 11:
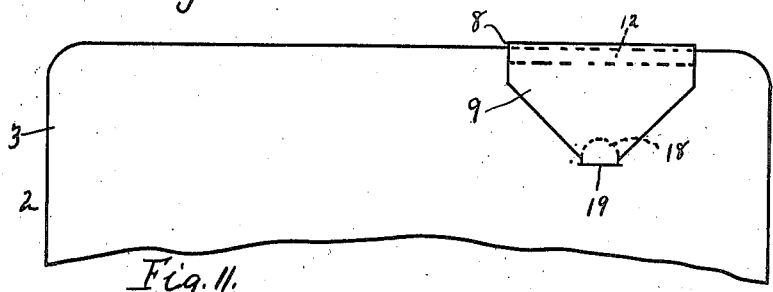
Fig. 11, is a view similar to Fig. 9 of another form of protector.
Figure 12:
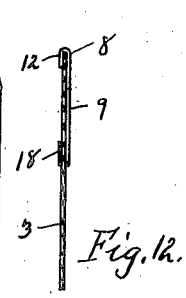
Fig. 12, is an edge view thereof similar to Fig. 10.

In Figs. 11 and 12 is illustrated another form of my adjustable tab, in which the lower edge of the body is provided with a single tongue 18, the same underlying the body and adapted to be inserted through a horizontal slot 19 formed in the tab sheet, Although I have illustrated and described a single tongue, it will be readily understood that any number may be used, and these tongues may be inserted through vertical slots, if the tab protector is used upon the side of the tab sheet.

Figure 13:
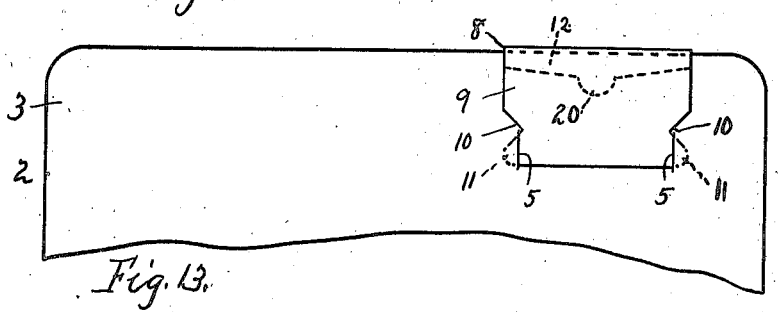
Fig. 13, is a fragmentary front elevation of the tab sheet, showing a still further modified form of my improved protector applied thereto.
Figure 14:
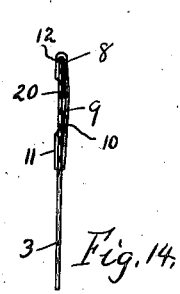
Fig. 14, is an edge view thereof, showing the tab sheet in section.
Figure 15:
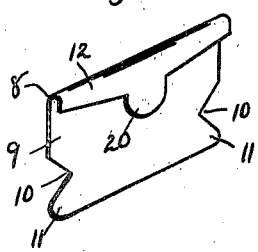
Fig. 15, is a perspective view of the protector removed from the tab sheet.

In Figs. 13, 14 and 15 I have shown the adjustable tab protector embodying all of the elements as described for the one shown in Fig. 1 with the addition of another tongue 20 adapted to be inserted in a horizontal slot from the back of the tab sheet, and although this tongue is shown projecting straight from the flange 12, it will be readily understood that the same may underlie said flange in the same manner as the tongue 18 shown in Figs. 11 and 12.

Figure 16:
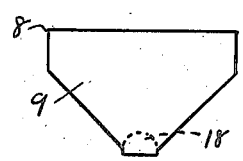
Fig. 16, is a front elevation of another form of my protector.
Figure 17:
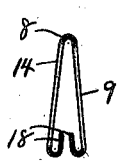
Fig. 17, is an edge view thereof.

In Figs. 16 and 17 the two leaves of the tab forming the body and flange are of approximately the same length, and each of these is provided with a tongue 18 each projecting back upon the member with which it is formed, similar to the one shown in Figs. 11 and 12, and these tongues are adapted to be inserted in the same slot or in coinciding slots formed in both walls of a two-ply tab sheet, said slots being formed parallel with the edge of the tab sheet over which the tab protector projects.

Figure 18:
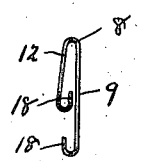
Fig. 18, is an edge view of a slightly modified form of the device shown in Fig. 17.

Fig. 18 illustrates a similarly constructed tab protector, the only difference being that one of the leaves or the flange is of less length than the other leaf or body, so that the tongues thereof are inserted in two slots in different positions.

Of course I do not wish to be limited to the exact details of construction as herein shown, as these may be varied within the limits of the appended claims without departing from the spirit of my invention.

Having thus fully described my invention, what I claim as new and useful is—

1. An adjustable tab protector formed from a single piece of sheet material folded to produce a body and a flange, said body having notches produced therein to form attaching tongues at the free corners.

2. An adjustable tab protector formed from a single piece of sheet material folded to produce a body and a flange, said body having a notch formed in each of the side edges opposite each other to produce tongues.

3. An adjustable tab protector formed from a single sheet of material bent upon itself to form two parallel members, one of said members having notches cut in the side edges adjacent the lower edge for dividing the same into a body and a pair of tongues.

4. An adjustable tab protector formed from a single sheet of material bent upon itself to form two parallel members, one of said members having notches formed in their side edges for producing tongues.

5. As a new article of manufacture an adjustable tab protector formed of transparent material and consisting of two integral parallel members, one of said members having tongues formed therefrom.

6. As a new article of manufacture an adjustable tab protector formed of transparent material and consisting of two integral parallel members, one of said members being of less length than the other and the longer member having tongues formed therefrom.

7. As a new article of manufacture an adjustable tab protector formed of transparent material and consisting of two integral parallel members, one of said members being of less length than the other, said longer member having notches formed in its side edges for dividing the same into a body and a pair of tongues.

8. A tab protector formed of transparent material and consisting of a body, tongues formed integral therewith, a flange formed integral with one edge of said body and projecting back upon the same, and a tongue formed integral with said flange.

9. As a new article of manufacture an adjustable tab protector formed of transparent material and consisting of two integral parallel members, and means formed with said members for insertion in slots of a tab sheet.

10. As a new article of manufacture an adjustable tab protector formed of transparent material and consisting of two integral parallel members, and tongues formed with said members.

In testimony whereof I have hereunto affixed my signature.

FREDERICK P. BUSHNELL.